United States Patent [19]

Hoffert

[11] Patent Number: 5,199,356

[45] Date of Patent: Apr. 6, 1993

[54] EFFICIENT INCINERATOR

[75] Inventor: Franklin D. Hoffert, Mountainside, N.J.

[73] Assignee: Power Generating, Inc., Fort Worth, Tex.

[21] Appl. No.: 809,009

[22] Filed: Dec. 17, 1991

[51] Int. Cl.$^5$ .............................................. F23G 5/00
[52] U.S. Cl. ................................... 110/346; 110/233; 60/39.464
[58] Field of Search ............... 110/245, 233, 234, 346; 60/39.464, 39.15

[56] References Cited

U.S. PATENT DOCUMENTS

| | | | |
|---|---|---|---|
| 3,589,313 | 6/1971 | Smith et al. | 110/233 X |
| 4,590,868 | 5/1986 | Ishihara | 60/39.464 X |
| 4,944,150 | 7/1990 | Ostman | 60/39.464 X |
| 5,072,675 | 12/1991 | Fowler | 110/346 |

OTHER PUBLICATIONS

*Coal-Burning Turbine;* Power Engineering; pp. 43–44; Strimbeck et al.; Feb. 1965.

*Primary Examiner*—Edward G. Favors
*Attorney, Agent, or Firm*—Charles W. Hanor

[57] ABSTRACT

A pressurized incineration method for pressurized incineration of a solid waste material to produce electrical and thermal energy is disclosed. A combustion chamber is fueled by a solid waste fuel. The chamber is pressurized by an air compressor and the fuel is combusted. The hot compressed gases created by combustion pass out of the combustion chamber into an exhaust line that splits so as to provide hot gases to a turbocharger and a separate power recovery turbine. The turbocharger and the power recovery turbine have a rugged design so as to handle compressed gases containing corrosive effluents and particulate matter. If necessary, gas cleaning equipment may also be used to reduce corrosive effluents and particulate matter to an acceptable level in the inlet gas stream to both the turbocharger and the power recovery turbine. Expansion of a portion of the hot compressed gas through the turbine section of the turbocharger provides energy to drive the turbocharger's air compressor. Expansion of the remaining hot compressed gas through a separate power recovery turbine creates mechanical energy that may be converted to electricity by an electrical generator.

2 Claims, 1 Drawing Sheet

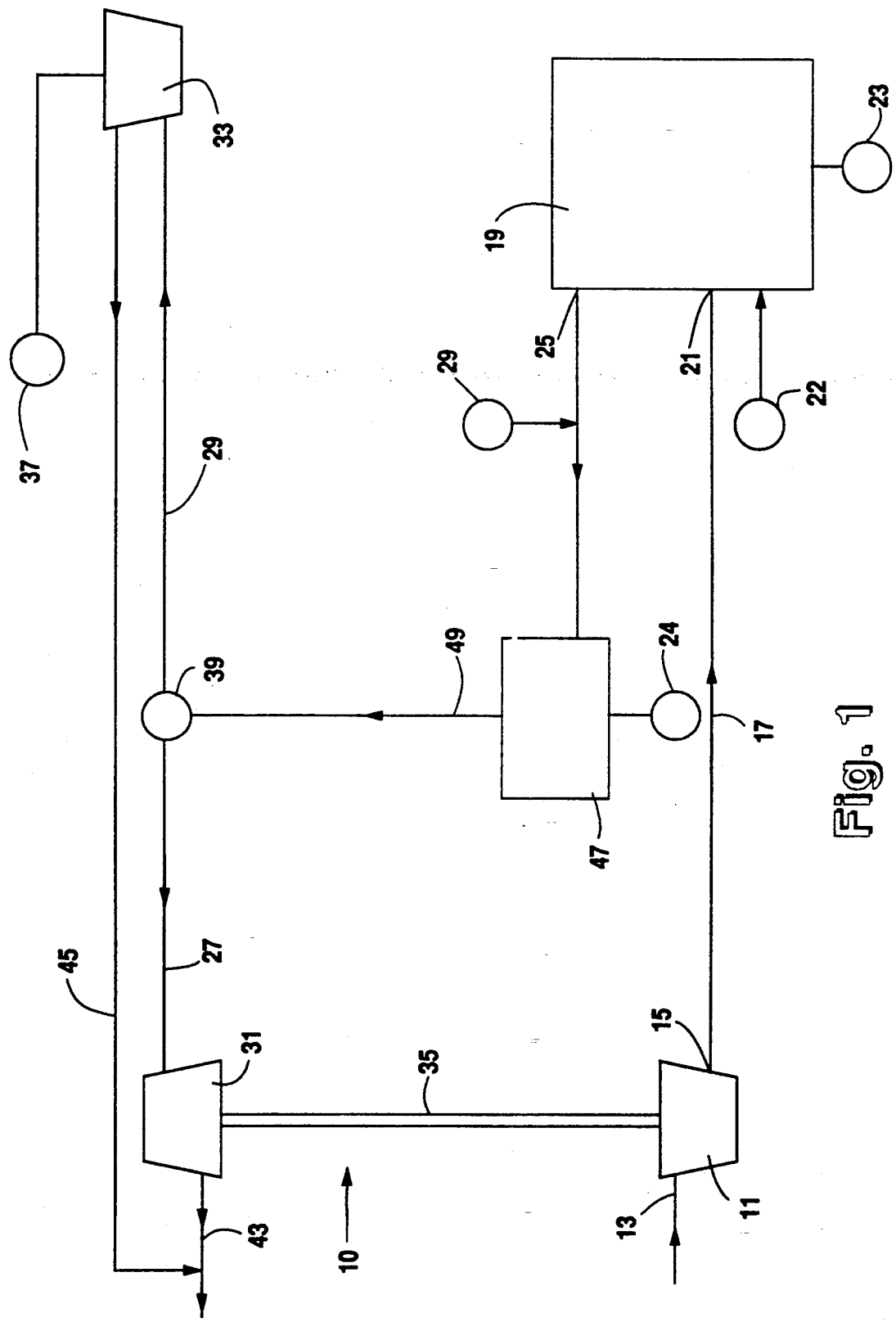

EFFICIENT INCINERATOR

BACKGROUND OF THE INVENTION

1. Field of the Invention

A pressurized incineration method for disposing of solid waste material while simultaneously producing electrical and thermal energy.

2. Description of the Prior Art

Power systems that generate electricity by driving gas turbines or steam turbines, using solid waste material as fuel, have existed for some time. Gas turbine power systems which operate on solid fuel are designed as either indirect-fired or direct-fired systems. These systems have several main components, an air compressor, a furnace or combustor chamber, a power turbine, and an electrical generator. The electrical generator and air compressor are driven by energy from the turbine, created by expansion of hot compressed air through the turbine. Hot compressed air for expansion in the turbine is developed by compressing air in the compressor and heating the compressed air with thermal energy created by the furnace or combustor.

In indirect-fired systems, the furnace or combustor typically operates as a separate functional unit apart from a functional unit containing the air compressor and the power turbine which are combined as integral parts of a gas turbine. This design for indirect-firing protects the gas turbine power section from corrosive effluents and particulate matter typically present in the hot exhaust gases from a furnace or combustor operating on solid fuel by use of a high temperature heat exchanger. Gas turbines generally do not work well when directly exposed to pressurized gases containing corrosive effluents and particulates because of wear and abrasion caused by such elements to the turbine's power section. The furnace/combustor unit and the compressor/turbine unit (gas turbine) exchange heat by means of a heat exchanger wherein ducts containing compressed air flowing to the power turbine are placed in close proximity to ducts bearing highly heated exhaust gases from the furnace or combustor, resulting in exchange of heat from the hot exhaust gases to the compressed air. This heated and compressed air then drives the power section of the gas turbine which in turn drives the turbine air compressor and an electric generator. Woodward U.S. Pat. No. 2,401,285 and Fernandes U.S. Pat. No. 3,473,331 disclose incinerator systems akin to that described above.

In direct-fired systems, the solid fuel is burned in an pressurized combustor and the heated products of combustion are vented directly into the power section of the turbine. The combustor is part of an integral pressurized unit including both the compressor and the power section of the gas turbine. In many instances, gas cleaning equipment may be employed between the combustor and the power section of the gas turbine. One example of a direct-fired gas turbine is disclosed in U.S. Pat. No. 4,850,288.

The general design of power systems incorporating a steam turbine is designated as the Rankine Cycle. In Rankine Cycle systems, a conventional boiler is used to create steam which drives a steam turbine. These systems may be designed to operate on a variety of fuels, including traditional hydrocarbon fuels and various other types of solid fuel. This type of power system is prevalent in the public utility industry and used to generate the majority of the electrical power in the U.S.

Some systems designed to produce energy, not to incinerate waste, use a diesel engine directly coupled to an electrical generator. The main pressurized exhaust stream is expanded across a turbocharger unit which provides energy to compress air for the diesel engine. The diesel engine is contained in the same functional unit as the power recovery turbine and turbocharger, so that the pressurized gaseous exhaust from the engine is fed directly through the turbocharger and the separate power recovery turbine. The mechanical energy created by expanding the remainder of the diesel exhaust across an additional turbine is transformed into additional electrical energy by an electrical generator. These systems are generally designed to operate on hydrocarbon gases or liquids. Their basic function is to generate either mechanical or electrical energy, not to eliminate solid waste material.

SUMMARY OF THE INVENTION

An object of the invention is to provide a pressurized incinerator that eliminates solid waste material, such as wood, where the pressurized combustion gases from the incineration chamber are used to drive a combination of power turbines.

Another object of the invention is to provide a pressurized incinerator of solid fuels that produces electrical energy from a turbine driven by exhaust from a pressurized combustion chamber.

Another object of the invention is to provide a pressurized incinerator of solid fuels that uses compressed air for its own combustion chamber from an air compressor driven by a turbine driven by exhaust from the combustion chamber.

Another object of the invention is to provide a pressurized incinerator of solid fuels that produces thermal energy from the exhaust of a turbocharger and a separate power recovery turbine, both driven by the pressurized hot exhaust gases from the combustion chamber. The thermal energy generated by the exhaust from the system can be used directly as a source of useful heat or converted to steam through the use of a heat recovery steam generator.

The invention differs from indirect-fired gas turbine incineration or power systems, for example, in that the combustion chamber is pressurized, and is an integral part of the same functional unit as the air compressor and the power turbine. The air compressor connects directly into the combustion chamber, which exhausts products of combustion through a gas clean-up system (optional) and then directly to both the turbocharger and the power turbine. In other words, the system of the present invention is direct-fired and does not incorporate a heat exchanger. In most applications, the system will use some form of gas clean-up equipment to eliminate excessive, corrosive effluents and particulates in the hot combustion gases to levels acceptable to both the turbocharger and power turbine. The turbocharger and power turbine are arranged in a combination that allows each to receive a portion of the combustion exhaust gases and are also ruggedly designed to handle a fairly high level of contaminants in the compressed gases emanating from the combustion chamber.

The invention differs from conventional direct-fired gas turbine power systems both in design and function. For example, the invention incorporates a turbocharger and a second power turbine as opposed to a gas turbine.

Consequently, the invention operates at a substantially lower operating temperature and pressure, and the turbocharger and power turbine operates at much lower RPM's than is typical for gas turbines. Furthermore, the turbocharger and power turbine are much more tolerant of corrosive effluents and particulate material in their hot gas inlet stream than a gas turbine is. This allows the invention to operate on higher ash fuels than direct-fired gas systems can generally tolerate. In terms of function, the invention is designed to eliminate a variety of solid waste material while generating some electrical and thermal energy. Direct-fired gas turbine power systems are designed to be efficient generators of electrical and th only able to operate on relatively low ash, clean solid fuels.

The invention differs from Rankine Cycle systems using solid fuel, for example, in that its basic design incorporates a direct-fired turbocharger and a separate power turbine, as opposed to a steam turbine. Consequently, the invention eliminates the need for a boiler or steam conversion, since it operates directly on hot combustion gases. This enables the system also to avoid the need for water and for associated piping and water treatment equipment.

The invention differs from the diesel engine system previously described both in design, as well as function. The invention provides a method of incinerating solid waste material which also produces valuable electrical and thermal energy. Revenue from the electrical and thermal energy created by the system can be used to offset general operating cost for the system or to help to pay for auxiliary services, e.g., pollution abatement equipment. The diesel engine system is designed solely to produce energy. In terms of basic design, the invention is also different from the diesel engine system described above in that the invention's combustion chamber operates on solid fuel while the diesel engine operates on hydrocarbon gas or liquid fuels.

BRIEF DESCRIPTION OF THE DRAWINGS

FIG. 1 is a schematic plan of the incineration system.

DESCRIPTION OF THE PREFERRED EMBODIMENT

The Efficient Incinerator 10 is designed to eliminate certain types of solid waste material while creating thermal and electrical energy. Atmospheric air enters the compressor 11 through intake lines 13, and after being compressed is discharged through a compressor outlet duct 15. The compressed air moves through line 17 and enters a combustion chamber 19 through a combustion chamber intake line 21. Solid combustible waste material is fed into the combustion chamber 19, under pressure by way of a force fuel feed system 22. The solid material is then burned under pressure in the combustor. Depending on the type of combustor utilized, bottom ash may be removed from the pressurized combustor 19 via system 23. Relatively clean effluent gas from the combustion chamber 19 is desirable to reduce corrosion and wear on the turbine incorporated in the Efficient Incinerator 10. Therefore, a pressurized combustion chamber producing clean effluent gas may be used, such as U.S. Pat. No. 4,850,288, to Hoffert which is herein incorporated by reference, disclosing a combustion chamber designed to combust particulate matter under pressure and produce a pressurized, relatively clean, effluent gas. It is to be understood that other types of pressurized combustion chambers may also be used.

The effluent gases created by combustion exit the combustion chamber 19 through a combustion chamber exhaust duct 25, being pushed out of the combustion chamber 19 as further compressed air enters the combustion chamber 19 through the combustion chamber intake line 17. After combustion, the temperature of the compressed combustion gases are typically quenched to an acceptable inlet temperature for the turbocharger and power turbine by injecting air, steam, water, or a mixture thereof with a quench system 29. For further processing to remove any existing contaminants, the hot compressed gases in line 25 may be passed through some type of gas cleaning equipment 47. The gas cleaning equipment 47 has an exhaust duct 49 which splits into the first and second turbine intake ducts 27, 29. The hot compressed effluent gases divide into two portions, the first of which enters the first turbine intake line 27 and the second portion enters the second turbine intake line 29. The hot compressed gases, both first and second portions, move through the first and second turbine intake lines and into the first and second turbines 31, 33, respectively. Fly ash is removed from 47 via system 24.

The first and second turbines 31, 33 have a rugged design, capable of handling compressed gases containing corrosive effluents and particulates such as may be found in the hot compressed gas portions. Typical gas turbines do not work well with such gases, however, turbochargers do work well with such gases, so the first turbine 31 is an integral part of a turbocharger. The second turbine 33 is a ruggedly designed power turbine also having the capacity to operate on dirty fuels.

Expansion of the first portion of hot compressed gas through the first turbine 31 provides mechanical energy via shaft 35 for driving the compressor 11. Expansion of the second portion of hot compressed gas through the second turbine 33 provided mechanical energy for driving an electrical generator 37, which produces electricity. A proportioning valve 39 may be placed at the intersection of the first and second turbine intake lines 27, 29 to regulate the flow of the first and second portions of the hot compressed gas so that the first turbine 31 receives enough hot compressed gas to provide energy sufficient to drive the compressor 11. The balance of the hot gas is expanded through turbine 33. The expanded, somewhat cooled gases exit the first and second turbines 31, 33 through the first and second turbine exhaust ducts 43, 45 respectively. These expanded gases still have substantial thermal energy to be used directly as a source of heat energy or fed into a heat recovery steam generator to produce process steam or additional electricity through the use of a steam turbine generator.

Turbines 31, 33 are designed to maximize energy production. The first turbine 31 is part of a turbocharger unit which must have the highest possible efficiency so that less mass flow is required to run the first turbine 31, and thus the air compressor, allowing more mass flow for the second power turbine 33 which has the electrical generator 37 attached. The second turbine 33 has a gas flow capacity of about half the capacity of the first turbine 31. If more capacity is desired, a larger second turbine 33 may be used or additional turbines may be placed in parallel with the second turbine 33.

The foregoing is the preferred embodiment of the invention. However, various changes can be made in the system without departing from the scope of the invention, so the preferred embodiment should not be interpreted as limiting the scope of the invention.

I claim:

1. A method of operating an incinerator with combustible solid waste products, said incinerator comprising, in combination, air compressor means for producing compressed air, air intake lines to provide air to said compressor, compressed air duct outlets, a fuel combustion chamber, a fuel combustion exhaust duct, a first turbine and a second turbine, said first turbine having compressor driving means coupled to it, said second turbine having an electrical generator coupled to it, said first and second turbines having turbine exhaust ducts respectively, said method comprising the steps of:

pressurizing said fuel combustion chamber with compressed air from said air compressor through said compressor intake line, introducing solid combustible waste material into said pressurized fuel combustion chamber, burning said solid waste material in said pressurized fuel combustion chamber, removing hot compressed gases created by combustion of said solid combustible waste material from said combustion chamber by fluid gas flow through said combustion exhaust duct, splitting said hot compressed gases into first and second portions, respectively, allowing said first portion of said hot compressed gases to expand and cool through said first turbine, providing energy to said air compressor from said first turbine, allowing said second portion of said hot compressed gases to expand and cool through said second turbine, generating mechanical energy from said second turbine, generating electricity from said second turbine by use of said electrical generator, exhausting gases of said first and second portions of said hot compressed gases, which were expanded and cooled through said first and second turbines, respectively, through said turbine exhaust ducts.

2. A method of operating an incinerator with combustible solid waste products, comprising the steps of:

pressurizing a fuel combustion chamber with compressed air from an air compressor through a compressor intake line, introducing solid combustible waste material into said pressurized fuel combustion chamber, burning said solid waste material in said pressurized fuel combustion chamber, removing hot compressed gases created by combustion of said solid combustible waste material from said combustion chamber by fluid gas flow through a combustion exhaust duct, splitting said hot compressed gases into first and second portions, respectively, allowing said first portion of said hot compressed gases to expand and cool through a first turbine, providing energy to said air compressor from said first turbine, allowing said second portion of said hot compressed gases to expand and cool through a second turbine, generating mechanical energy from a second turbine, generating electricity from said second turbine by use of an electrical generator, exhausting gases of said first and second portions of said hot compressed gases, which were expanded and cooled through said first and second turbines, respectively, through turbine exhaust ducts.

* * * * *